Oct. 16, 1962 W. M. L. JOHNSON 3,058,445
COLLAPSIBLE WIRE MESH CAGE
Filed Aug. 13, 1959 2 Sheets-Sheet 1
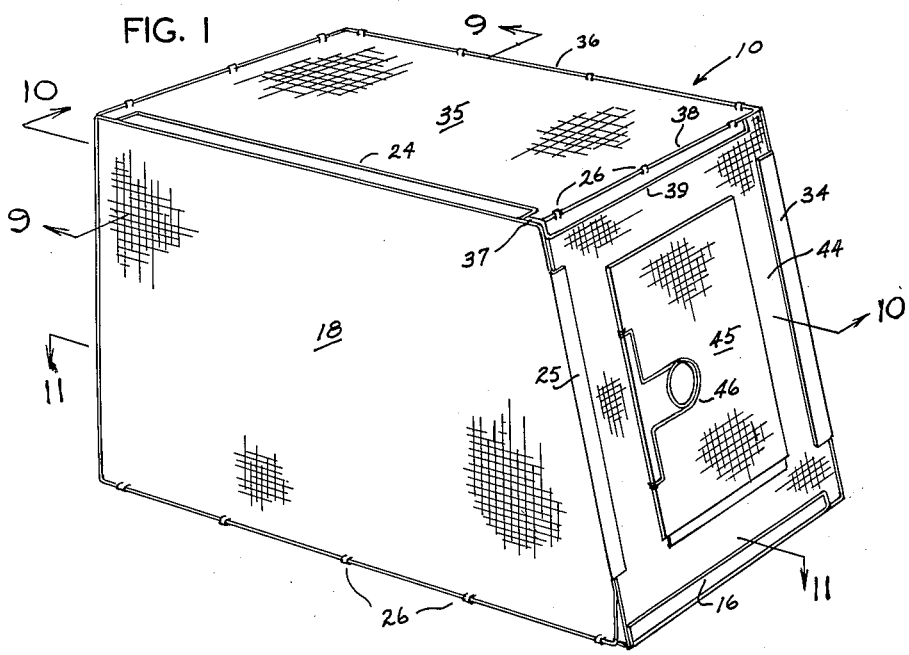
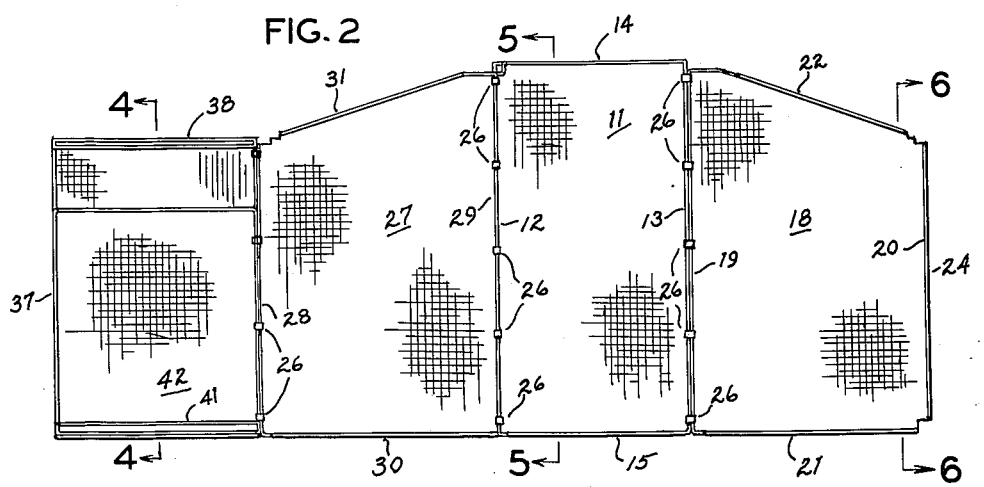
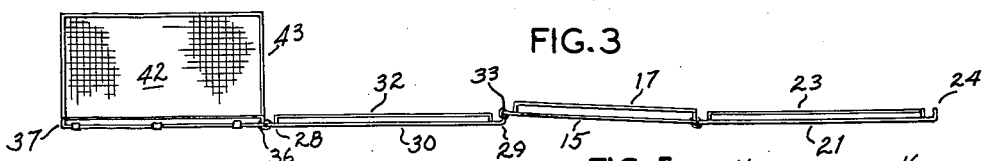
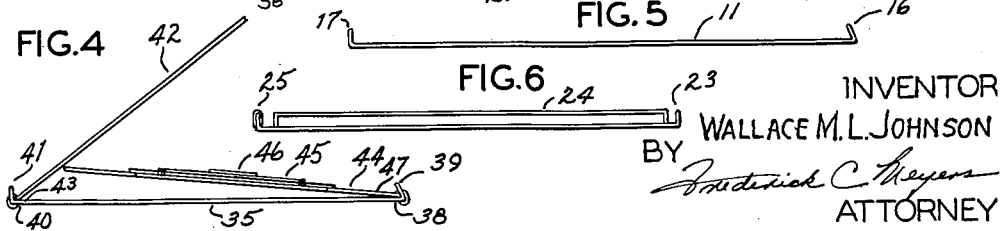
INVENTOR
WALLACE M. L. JOHNSON
BY Frederick C. Meyers
ATTORNEY

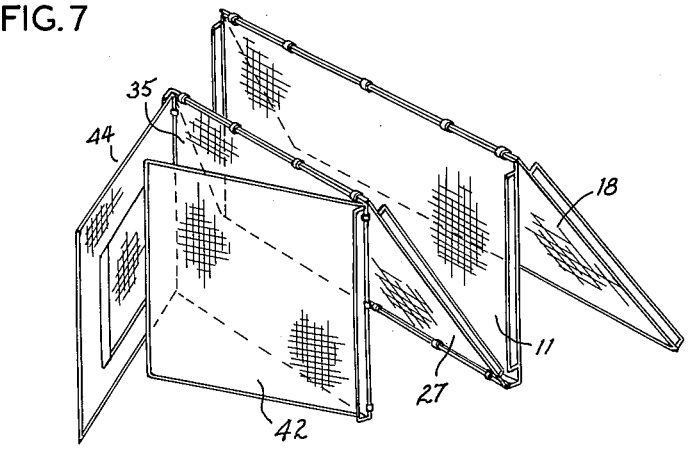
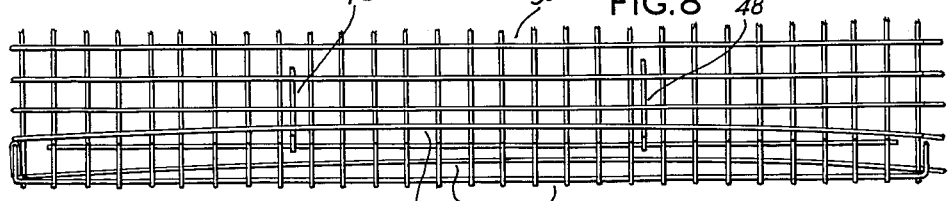
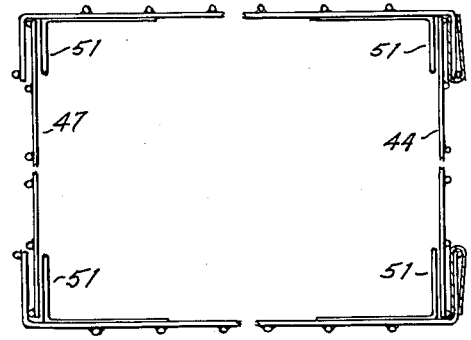
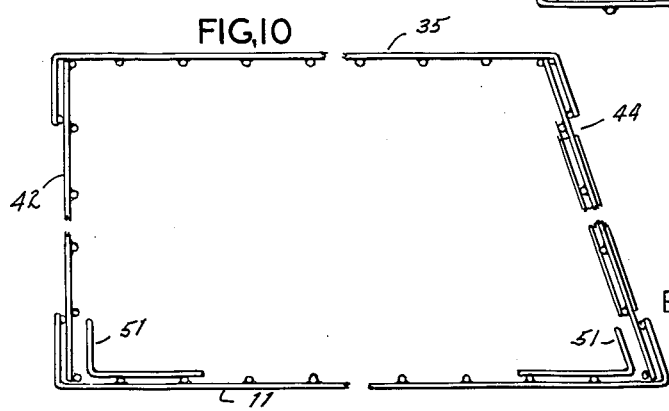

United States Patent Office 3,058,445
Patented Oct. 16, 1962

3,058,445
COLLAPSIBLE WIRE MESH CAGE
Wallace M. L. Johnson, 861 Clayland St., St. Paul, Minn.
Filed Aug. 13, 1959, Ser. No. 833,594
6 Claims. (Cl. 119—17)

This invention relates to a wire mesh cage construction, and more particularly, to a collapsible cage having a construction suitable for retaining animals such as dogs.

It is an important object of the invention to provide a sturdy and inexpensive cage construction which requires a minimum of effort to assemble, knock-down or maintain in use.

Another object of the invention is to provide a collapsible wire mesh cage constructed of panel screens of a shape and arrangement which lends itself to the production of a finished unit which can be compactly stored and transported in vehicles such as stationwagons, and which can be knocked-down to a compact size occupying but a fraction of the volume of the cage structure.

Another object of the invention is to provide a cage of the class described wherein the panel portions are interlocking as they are positioned during the erection of the cage, and the last panels to be placed in position are provided with locking elements which are utilized through a simple springing of the resilient panel edge in cooperation with fastener elements which engage and retain the panel in place under resilient stress.

A still further object of the invention is to provide a wire mesh cage which is constructed entirely of foldable panel members which abut and interlock in such a manner as to render the cage of strong and sturdy construction, yet without the use of any separate fastener members such as bolts, hinges, folding catches or the like.

These and other objects and advantages of my invention will more fully appear from the following description, made in connection with the accompanying drawings, wherein like reference characters refer to the same parts throughout the several views and in which:

FIGURE 1 shows a perspective view of the cage in completely assembled condition;

FIGURE 2 is a plan view of the box in disassembled condition and opened to show the relationship between the panels;

FIGURE 3 is an edge view of the opened panel structure of FIGURE 2;

FIGURE 4 is a somewhat enlarged diagrammatic view showing the position of the back and front panels with respect to the top as viewed along the line 4—4 and looking in the direction of the arrows;

FIGURE 5 is a somewhat enlarged diagrammatic representation of the cross-sectional appearance of the bottom panel taken on the line 5—5 in FIGURE 2 and looking in the direction of the arrows;

FIGURE 6 is a somewhat enlarged diagrammatic representation of the cross-sectional appearance of the side panel construction taken on the line 6—6 of FIGURE 2 and looking in the direction of the arrows;

FIGURE 7 is a perspective view of the entire box in semi-collapsed condition showing the relationship of the panels in order to effect a completely compacted knockdown arrangement;

FIGURE 8 is a detailed enlarged segmental view of the edge structure of the keying or locking panels in finally fastened engagement;

FIGURE 9 is a diagrammatic segmented representation of the appearance of the completely assembled cage taken on the line 9—9 of FIGURE 1 and looking in the direction of the arrows;

FIGURE 10 is a similar diagrammatic representation taken on the line 10—10 of FIGURE 1 and looking in the direction of the arrows; and FIGURE 11 is a similar diagrammatic representation taken on the line 11—11 of FIGURE 1 and looking in the direction of the arrows.

With continued reference to the drawings, my completed assembled cage is shown in FIG. 1 where it is designated by the numeral 10. The box is made from a wire mesh material of a non-rusting type and has sufficient rigidity when interlocked by the hinge and fastening structure hereinafter described, to prevent the cage from becoming distorted or loosened at its joints during use or storage.

The flattened assembly is illustrated in FIG. 2, and shows the relationship of the panels and end walls laid out with the panels forming a series connected together at their respective parallel side edges. The bottom panel 11 is shown as generally rectangular in shape and provided with parallel side edges 12 and 13 and end edges 14 and 15, as shown. Each of the end edges 14 and 15 are provided with upstanding flanges 16 and 17, respectively, as shown in the diagrammatic representation of FIG. 5. The flange portions may consitute solid strips as at 16 or bent wire members as at 17.

A pair of side panels 18 and 19 respectively are provided at each side of the bottom panel 11, as shown in FIG. 2. The side panel 18 has parallel side edges 19 and 20 and end edges 21 and 22 which are angulated divergently with respect to one another toward the side edge 19. In the form shown, the edge 21 is at right angles to the side edges, but the edge 22 is outwardly angled toward the juncture between edges 13 and 19, the end edge 21 being provided with a bent wire or flange 23 and the side edge 20 is provided with a similar flange 24. The end edge 22 is provided with a metal strip or flange 25, as shown in FIGS. 1 and 6. The side panel 18 is hingedly secured at its side edge 19 to the bottom panel 11 at its side edge 13, as shown in FIG. 2. Simple ring members 26 may be utilized to join the edges 13 and 19 while permitting the side panel 18 to swing upwardly about the hinge juncture.

Another side panel 27 is provided with parallel side edges 28 and 29 and with end edges 30 and 31, as shown in FIG. 2. The end edges 30 and 31 are divergent with respect to one another as they approach the juncture between the edges 29 and 12. As in the case of side panel 18, the end edge 31 which defines the front of the cage is shown to be angulated while the rear edge 30 is at right angles to the side edges 28 and 29. The rear edge 30 has an upwardly directed wire flange 32 and the side edge 29 is provided with an upwardly bent wire flange 33 which is hingedly connected to the side edge 12 of bottom 11 by means of hinge elements such as rings 26. The end edge 31 is provided with a metal strip 34 bent into a flange, as shown in FIG. 1. The off-set or flanged wire 33 provides clearance between the bottom panel 11 and side panel 27 when they are hingedly folded together in face-to-face relation.

The top panel is indicated generally at 35 and has a side edge 36 and a free side edge 37 which is generally parallel to side edge 36 but is bent slightly inwardly as shown at FIG. 8 for a purpose to be later described. The top panel 35 is provided with a forward end edge 38 which has a downwardly formed wire flange 39, as shown in FIG. 1 and FIG. 4. Top panel 35 also has a rear end edge 40 which is provided with the wire flange 41, as shown in FIG. 4. The top panel 35 is hingedly connected at its edge 36 to the side edge 28 of side panel 27 and rings 26 may be utilized for the hinged connection as previously described.

Hingedly connected to the rear edge 40 is an end wall 42 which, in the form shown, constitutes the back of the cage. The same hinge or ring elements 26 may be employed, as shown in FIG. 4. The end wall 42 is provided with a plain peripheral edge 43 which is hingedly connected to the end edge 40 of top panel 35 in the manner described above.

Also hingedly connected to the top panel 35 is the end wall 44 which constitutes the front of the cage and is provided with a hinged door 45 and a latch 46, details of which are not essential to the instant disclosure. The end panel 44 is provided with a peripheral edge 47 which, in turn, is hingedly connected to the top panel by means of ring elements 26, as shown in FIG. 1.

An important part of the invention resides in the means by which the free edges 20 of side panel 18 and 37 of top panel 35 are secured together when the box is assembled. Referring now to FIG. 8, top panel 35 is shown as having an inwardly curved free edge 37 and hook means 48 secured thereto as by welding. The hooks 48 extend upwardly at 49, as shown in FIG. 9, then over and reversely downward at 50 so as to extend above the plane defined by top panel 35. The flange 24 of side panel 18 normally lies above each hook 48 and somewhat outwardly thereof. In order to engage the hooks, the flange wire 24, together with the side panel 18, is pressed inwardly and downwardly so as to pass beneath the terminus 50 of the hook 48 and then is permitted to resiliently spring upward and outward to remain latched in position, as shown in FIG. 8. There are no external screw fasteners or moving parts utilized to fasten any of the panel or wall members together, and the entire assemblage may be effected in a matter of a few seconds.

In order to better retain the end wall members 44 and 47 in their proper position with respect to the panel members of the cage, wire abutments 51 may be secured adjacent the respective flange members in opposed abutting relation with the walls 44 and 47, as shown in FIGS. 10 and 11.

When it is desired to collapse the cage, panels 11 and 18 are folded in back-to-back relation, as shown in FIG. 7, and side panel 27 is brought into face-to-face relation with panel 11 with the previously noted clearance for the flange elements. The top panel 35 is then folded into back-to-back contact with the side panel 27 and the end walls 42 and 44 may be overlapped against top panel 35 as shown in FIG. 7. Since the end wall 44 is of greater length than the end wall 42, it may be conveniently folded outwardly of wall 42 if the top panel 35 is equal to, or shorter than, the length of front end wall 44.

It will, of course, be understood that various changes may be made in the form, details, arrangements and proportions of the parts without departing from the scope of my invention as set forth in the appended claims.

What I claim is:

1. A collapsible mesh cage comprising, a side panel, a bottom panel, a second side panel and a top panel, said panels being hingedly connected together at their respective parallel side edges in series with the first and last panels in the series having outermost free edges, each of said top and bottom panels having a pair of end edges in spaced parallel relation and each of said side panels having a pair of end edges downwardly divergent towards said bottom panel, an end wall hingedly secured to an end edge of one of said panels at one side of said panels in their series connection, another end wall hingedly secured to an end edge of one of said panels at the other side of said panels in their series connection, flange means formed at the end edges of said side, bottom and top panels other than those to which an end wall is hingedly secured and adapted to marginally overlie the corresponding edges of each of said end walls, and means for holding juxtaposed the respective free edges of the first and last panels whereby to interlock the end walls in downwardly divergent relation and to prevent outward displacement thereof from the assembled cage.

2. A collapsible mesh cage comprising, a side panel, a bottom panel, a second side panel and a top panel, said panels being hingedly connected together at their respective parallel side edges in series and the first and last panels in the series having outermost free edges, each of said top and bottom panels having a pair of end edges in spaced parallel relation and each of said side panels having a pair of end edges downwardly divergent toward said bottom panel, a pair of end walls hingedly secured respectively to the end edges of the top panel, flange means formed at the end edges of said side panels and said bottom panel and adapted to marginally overlie the corresponding edges of each of said end walls, and means for holding juxtaposed the respective free edges of the first and last panels whereby to interlock the end walls in downwardly divergent relation and to prevent outward displacement thereof from the assembled cage.

3. A collapsible mesh cage comprising, a side panel, a bottom panel, a second side panel and a top panel, said panels being hingedly connected together at their respective parallel side edges in series and the first and last panels in the series having outermost free edges, each of said top and bottom panels having a pair of end edges in spaced parallel relation and each of said side panels having a corresponding end edge lying at an acute angle with the edge juncture between the side and bottom panels, an end wall hingedly secured to each end edge of the top panel, flange means formed at the end edges of said side panels and said bottom panel and adapted to marginally overlie the corresponding edges of each of said end walls, and means for holding juxtaposed the respective free edges of the first and last panels whereby to interlock the end walls in downwardly divergent relation and to prevent outward displacement thereof from the assembled cage.

4. In a wire mesh cage having a side panel, a bottom panel, a second side panel and a top panel, and a pair of end walls, permanent hinge means interconnecting the said panels in series, one of the edges in each of the first and last of said panels being unhinged but adapted to be juxtaposed during assembly, hook means secured to one of said first and last panels and adapted to interfit with the margin of the other of said first and last panels upon springing the other over said hook means whereby to lock the entire cage in assembled condition upon relaxing the springing force upon said other panel.

5. In a collapsible wire cage having a side panel, a bottom panel, a second side panel, a top panel, and a pair of end walls, permanent hinge means interconnecting the said panels in series, the outermost edge of the first and last of said panels being free but adapted to be juxtaposed during assembly, hook means secured to one of said first and last panels rearwardly of the free edge thereof, said free edge having a slight inward curvature, the free edge of the other of said first and last panels being adapted to bend resiliently against said inward curvature and to be secured to said hook means with resilient retention whereby to maintain the entire cage in assembled condition.

6. In a collapsible mesh cage having a side panel, a bottom panel, a second side panel, a top panel, and a pair of end walls, permanent hinge means interconnecting the said panels in series, one of the edges in each of the first and last of said panels being free but adapted to be juxtaposed during assembly, hook means secured to one of said first and last panels adjacent the free edge thereof, said hook means being curved outwardly from the panel, then rearwardly from said free edge and terminating inwardly toward said panel, the free edge of the other of said first and last panels lying outwardly and marginally beyond said hook means before latching and being capable of springing inwardly to engage said hook means and to lie biased thereagainst when in latched position.

References Cited in the file of this patent

UNITED STATES PATENTS

| | | |
|---|---|---|
| 1,671,051 | Soderquist | May 22, 1928 |
| 1,973,952 | Golberg | Sept. 18, 1934 |
| 2,530,148 | Bjorklund et al. | Nov. 14, 1950 |
| 2,965,259 | Johnson | Dec. 20, 1960 |